US012425403B2

(12) United States Patent
Manivannan

(10) Patent No.: US 12,425,403 B2
(45) Date of Patent: Sep. 23, 2025

(54) AUTHENTICATOR PUSH NOTIFICATION CHECK IN OFFLINE MODE

(71) Applicant: International Business Machines Corporation, Armonk, NY (US)

(72) Inventor: Vignesh Manivannan, Vellore (IN)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 18/368,727

(22) Filed: Sep. 15, 2023

(65) Prior Publication Data

US 2025/0097225 A1 Mar. 20, 2025

(51) Int. Cl.
*G06F 21/00* (2013.01)
*H04L 9/40* (2022.01)

(52) U.S. Cl.
CPC ........ *H04L 63/0884* (2013.01); *H04L 63/108* (2013.01)

(58) Field of Classification Search
CPC ... H04L 63/0884; H04L 63/108; H04L 63/08; H04L 2463/082
See application file for complete search history.

(56) References Cited

U.S. PATENT DOCUMENTS

| 10,754,972 B2* | 8/2020 | Efendiyev | H04L 9/088 |
| 12,011,094 B2* | 6/2024 | Canfield | A47C 20/041 |
| 2014/0047065 A1 | 2/2014 | Kim | |
| 2018/0013851 A1* | 1/2018 | Pollack | H04L 67/55 |
| 2019/0253509 A1* | 8/2019 | Kumar | H04L 63/08 |
| 2019/0305955 A1* | 10/2019 | Verma | H04L 9/3247 |
| 2021/0256468 A1* | 8/2021 | Downing | G06Q 10/0835 |
| 2022/0255931 A1* | 8/2022 | Avetisov | H04L 9/3247 |
| 2022/0337588 A1* | 10/2022 | Jarvis | H04L 63/102 |
| 2023/0055282 A1* | 2/2023 | Canfield | A47C 20/041 |

(Continued)

FOREIGN PATENT DOCUMENTS

CN 107770035 A 3/2018

OTHER PUBLICATIONS

"Push Notification Authentication Method FAQ," obtained Mar. 2023, https://www.mypos.com/en-ee/faq/client/account/push-notification-authentication-method.

(Continued)

*Primary Examiner* — Kendall Dolly
(74) *Attorney, Agent, or Firm* — Eric W. Chesley

(57) ABSTRACT

A technique for multi-factor authenticating a user on a first device, the user having an associated second device configured with an authenticator application, and wherein the authenticator application is offline. In this scenario, and responsive to receipt of a request to access a protected resource, a push notification is sent to the authenticator. While the push notification remains pending, a delivery status of the push notification is requested. Upon determining based on the delivery status that the authenticator is offline, an alert is provided to the user, preferably in a user interface of the first device, and indicates the delivery status of the push notification. The alert also includes an instruction to the user to attempt an authentication through an alternative communication channel. The user is then permitted to access the protected resource only upon completing the authentication through the alternative communication channel.

20 Claims, 5 Drawing Sheets

(56) References Cited

U.S. PATENT DOCUMENTS

2024/0137365 A1\* 4/2024 Neighbour ............ H04L 63/102
2024/0236099 A9\* 7/2024 Neighbour ............ H04L 63/102
2025/0080517 A1\* 3/2025 Zimny .................... H04L 63/08

OTHER PUBLICATIONS

"Offline Mode for Secure Workstation Login," obtained Mar. 2023, https://www.authx.com/offline-authentication/.

\* cited by examiner

AUTHENTICATOR PUSH NOTIFICATION CHECK IN OFFLINE MODE

BACKGROUND

Technical Field

This disclosure relates generally to the field of user authentication, and more particularly to the management of push notifications to user devices during such authentication.

Background of the Related Art

Push notifications, also referred to as server push notifications, are the delivery of information from a software application to a computing device without a specific request from the computing device. Push notifications allow applications to notify end users of new messages, or events, even when end users are not actively using the application. Push notifications typically, but not always, originate from a server. In many cases, end users must opt-in to receive push notifications. Opt-ins usually take place during the application install process, but end users are typically also provided with a way to manage alerts independently of the install process in case they change their preferences at a later time.

A common use case for push notifications is multi-factor authentication (MFA). Multi-factor authentication (MFA) is an identity verification method that requires users to provide at least one authentication factor in addition to a password, or at least two authentication factors instead of a password, to gain access to a web site, application or network (a "protected resource"). Most employees or internet users have encountered a subtype of MFA, called two-factor authentication (2FA), which requires users to supply a password and a second factor, —typically a passcode sent to a mobile phone or email—to log in to a system or web site. In lieu of having the user supply the second factor directly, the user's acceptance of a push notification may be used instead. In this context, push notification authentication enables user authentication by sending a push notification directly to a secure authenticator application on the user's device, alerting the user that an authentication attempt is taking place (e.g., from another device). Users can view authentication details and approve or deny access, typically via a simple press of a button. Notifications can be sent in-band or out-of-band, using any number of communications channels. The push notification (upon acknowledgement by the user) authenticates the user by confirming that the user possesses the device, typically a mobile device, registered with the authentication system.

While the above-described operating scenario works very well for its intended purpose, it assumes that an active Internet connection is available over which the user's approval or denial (of the notification) may then be received. If the Internet connectivity is non-existent (or poor/unstable), it is not possible to complete the multi-factor authentication necessary to enable the user's desired access to the protected resource.

BRIEF SUMMARY

The technique herein provides for a technique for authenticating a user on a first device, the user having an associated second device configured with an authenticator application, and wherein network access to the authenticator application cannot be assured (e.g., because of a non-existent or poor Internet connection). A representative first device is a network-accessible computing system that provides the user access to a protected resource upon the user's successful authentication, e.g., via a multi-factor authentication (MFA) scheme. Typically, the multi-factor authentication involves a first authentication that occurs by the user entering login information (e.g., username and password) on a secure login page provided to the user in a browser (or the like) at the first device. A second factor of the multi-factor authentication is one that would normally be enabled using a push notification scheme on the second device, which is typically the user's mobile device, such as a smart phone or tablet. When network access to the second device (and thus the authenticator application) cannot be assured, the authenticator application is said to be "offline," and the following method is provided.

In particular, and responsive to receipt of a request to access a protected resource, a push notification is sent or caused to be sent to the authenticator application of the second device. While the push notification remains pending (i.e., presumably sent but as yet un-acknowledged), a delivery status of the push notification is requested. Upon determining based on the delivery status that the push notification has been successfully delivered to the authenticator application (i.e., that the authenticator application is not offline), the method continues by initiating a timeout from a timer. The timeout represents a time period during which the push notification must be acknowledged to enable the user to be authenticated. If before the timeout expires the system thereafter receives an indication that the push notification has been successfully acknowledged, the authentication completes and the user is permitted access to the protected resource. If, however, upon determining based on the delivery status that the push notification has not been successfully delivered to the authenticator application (i.e., the authenticator application is offline), an alert is provided to the user. Preferably, this alert is provided in a user interface of the first device and indicates the delivery status of the push notification (i.e., that the push notification delivery has not succeeded). The alert also includes or has associated therewith an instruction to the user to attempt an authentication through an alternative communication channel. In the latter case (when the push notification channel has failed), the user is permitted to access the protected resource only upon completing the authentication through the alternative communication channel.

The foregoing has outlined some of the more pertinent features of the
disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
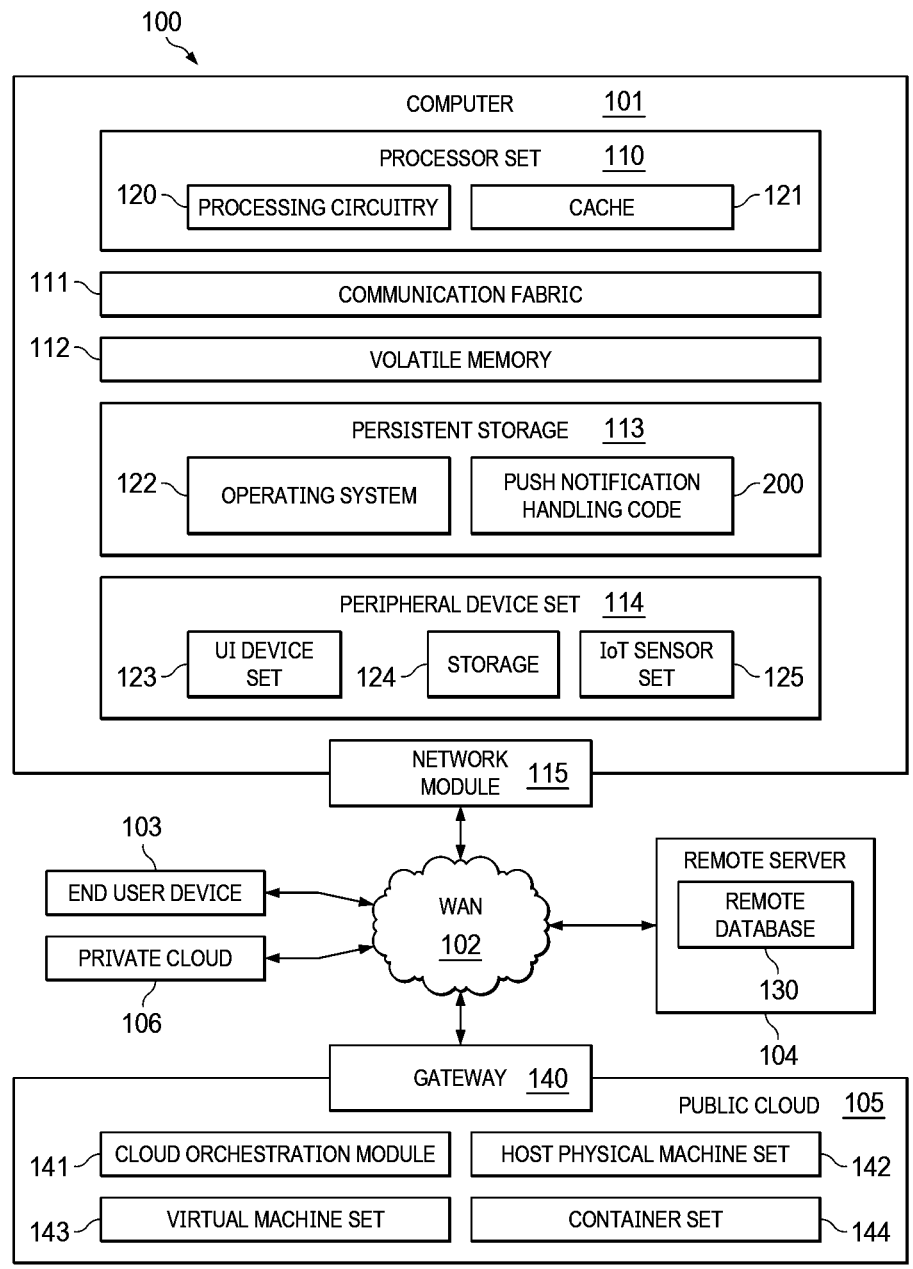
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the push notification handling code 200 of this disclosure. As will be described below, this handling code enforces a delivery status request processing flow that provides significant advantages during a user authentication workflow. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Push Notifications

Figure 2:
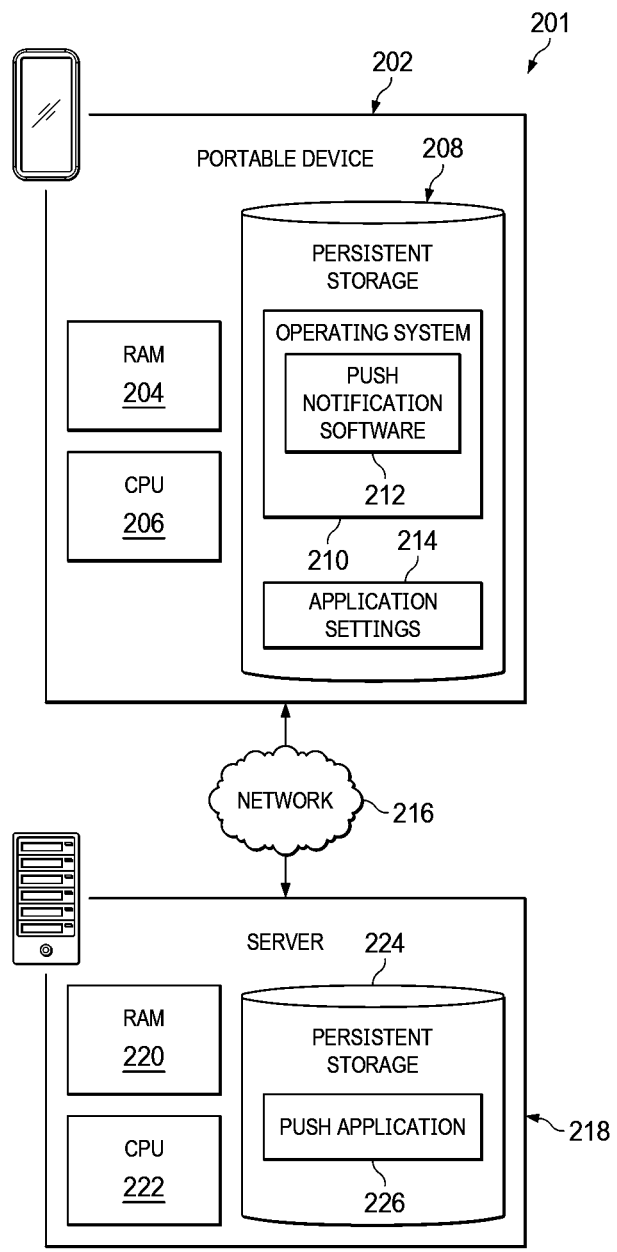
FIG. 2 is a functional block diagram illustrating a push notification environment, in an embodiment in accordance with the disclosed subject matter.

FIG. 2 is a functional block diagram, generally designated 201, illustrating a push notification environment, in an embodiment. The push notification environment 201 includes portable device 202, server 218, and other computing devices (not shown), all interconnected over network 216. Portable device 202 includes random access memory (RAM) 204, central processing unit (CPU) 206, and persistent storage 208. Portable device 202 may be any other electronic device or computing system, capable of processing program instructions and receiving and sending data. In some embodiments, portable device 202 may be a laptop computer, a tablet computer, a netbook computer, a personal computer (PC), a desktop computer, a personal digital assistant (PDA), a smart phone, a smart watch or any programmable electronic device capable of communicating over a data connection to network 216. In other embodiments, portable device 202 may represent server computing systems utilizing multiple computers as a server system, such as in a distributed computing environment. In general, portable device 202 is representative of any electronic devices or combinations of electronic devices capable of executing machine-readable program instructions and communicating with server 218 via network 216 and with various components and devices (not shown) within push notification environment 201.

Portable device 202 includes persistent storage 208. Persistent storage 208 may, for example, be a hard disk drive. Alternatively, or in addition to a magnetic hard disk drive, persistent storage 208 may include a solid state hard drive, a semiconductor storage device, read-only memory (ROM), erasable programmable read-only memory (EPROM), flash memory, or any other computer-readable storage medium that is capable of storing program instructions or digital information. Operating system 210 is stored in persistent storage 208, and contains push notification software 212. Persistent storage 208 also contains application settings 214.

Operating system 210 is software that enables portable device 202 to communicate with server 218 and other computing devices (not shown) of push notification environment 201 over a data connection on network 216. Persistent storage 208 includes application settings 214 that are used by push notification software 212 to store user settings pertaining to applications and contexts for push notifications. Application settings 214 are configurable by a user via a user interface of portable device 202, or through the application settings of one or more executing programs, or set of applications, on portable device 202. In other example embodiments, push notification software 212 and application settings 214 may be components of an operating system software.

Push notification software 212 is a computer program, or sets of computer programs, that are stored in persistent storage 208. Push notification software 212 enables a user to register applications and contexts to create notification rules for suppressing push notifications. For example, a user may be engaged in an application on portable device 202 and receive a push notification or other notification. The arriving notification (for example, a text message) will pause the application and require interaction by the user to clear the screen and/or deal with the arriving message, or the notification may be represented by a sound or vibration on the portable device 202. Portable device 202 may include internal and external hardware components, In FIG. 2, network 216 is shown as the interconnecting fabric between portable device 202, server 218, and with various components and devices (not shown) within push notification environment 201. In practice, the connection may be any viable data transport network, such as, for example, a LAN or WAN. Network 216 can be for example, a local area network (LAN), a wide area network (WAN) such as the Internet, or a combination of the two, and include wired, wireless, or fiber optic connections. In general, network 216 can be any combination of connections and protocols that will support communications between portable device 202, server 218, and with various components and devices (not shown) within push notification environment 201.

Server 218 is included in push notification environment 201. Server 218 includes user random access memory (RAM) 220, central processing unit (CPU) 222, and persistent storage 224. Server 218 may be a Web server, or any other electronic device or computing system, capable of processing program instructions and receiving and sending data. In some embodiments, server 218 may be a laptop computer, a tablet computer, a netbook computer, a personal computer (PC), a desktop computer, a personal digital assistant (PDA), a smart phone, or any programmable electronic device capable of communicating over a data connection to network 216. In other embodiments, server 218 may represent server computing systems utilizing multiple computers as a server system, such as in a distributed computing environment. In general, server 218 is representative of any electronic devices or combinations of electronic devices capable of executing machine-readable program instructions and communicating with portable device 202 via network 216 and with various components and devices (not shown) within push notification environment 201.

Server 218 includes persistent storage 224. Persistent storage 224 may, for example, be a hard disk drive. Alternatively, or in addition to a magnetic hard disk drive, persistent storage 224 may include a solid state hard drive, a semiconductor storage device, read-only memory (ROM), erasable programmable read-only memory (EPROM), flash memory, or any other computer-readable storage medium that is capable of storing program instructions or digital information. Push application 226 is stored in persistent storage 224, which also includes operating system software, as well as software that enables server 218 to detect and establish a connection to portable device 202, and communicate with other computing devices (not shown) of push notification environment 201 over a data connection on network 216. In the example embodiment of FIG. 2, push application 226 may be used to send push notifications or messages to portable device 202 or other devices (not shown) within push notification environment 201.

The functionality of the push notification software described above may be provided as a software-based service. For example, IBM® Push Notifications service enables users to send and manage mobile and web push notifications using an intuitive user interface, client SDKs and simple REST APIs to configure, monitor and send notifications.

Figure 3:
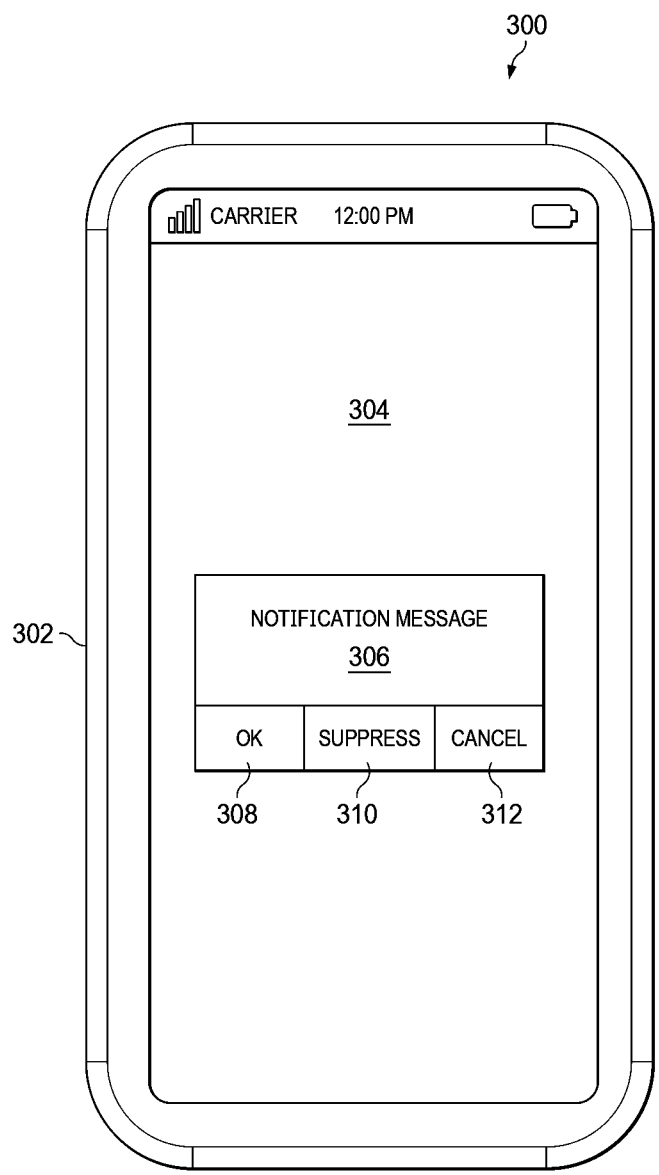
FIG. 3 is an illustration of a push notification, received on a portable device within the push notification environment of FIG. 1.

FIG. 3 is an illustration, generally designated 300, of a push notification, received on a portable device (e.g. portable device 202) within the push notification environment of FIG. 2, for enabling a user to suppress push notifications within the context of an executing application, in an embodiment in accordance with the present invention. In an example embodiment, a user receives a visual notification (e.g., notification message 306), on user interface 304 while using an application on portable device 302. Notification message 306 contains the received message and provides the user with 3 options, "OK" 308, "Suppress" 310, and "Cancel" 312. Examples of notifications include, but are not limited to, the following: (i) push notifications, (ii) text messages, (iii) email notifications, (iv) Short Message Service (SMS) messages, and (v) phone calls. SMS is a text messaging service component of a mobile device, such as portable device 302, Web, or mobile communication systems that uses standardized communications protocols to allow fixed line or mobile phone devices to exchange short text messages.

The user of portable device 302 determines that the context for the application should be special, or uninterrupted, and suspends notifications during a particular time or while the application is in use. Push notification software 212 displays received notification message 306 on user interface 304 as depicted in FIG. 3. Notification message 306 presents the user with the option to accept received notification message 306 using option "OK" 308, suppress received notification message 306 using option "Suppress" 310, or ignore received notification message 306 using option "Cancel" 312. Upon the user accepting received notification message 306 by selecting option "OK" 308, typically the target application indicated by received notification message 306 is launched, or brought forward into view, to allow the user of portable device 302 to perform one or more actions regarding received notification message 306.

Upon suppressing received notification message 306 in response to the user selecting option "Suppress" 310, typically push notification software 212 registers the current executing application and/or the context in application settings 214 to suppress, or prevent, future notifications from being displayed on user interface 304 when the user is using the same application and/or is in the same context. Push notification software 212 may also be configured to search for previously defined push notification rules to determine if a rule matches the current executing application and/or context. If a matching rule is found, push notification software 212 stores the push notification until a later time when the push notification rule is deactivated, or when the user of portable device 302 decides to view the suppressed push notification. If an existing push notification rule is not found, push notification software 212 may create a new push notification rule for the current executing application and/or the context, and stores the received push notification in persistent storage 208. In one example embodiment, suppressing future notifications may include, but is not limited to, suppressing audio notifications (e.g., sounds), visual notifications (e.g., text or image), and haptic notifications (e.g., vibrations and temperature). In other example embodiments, upon selecting option "Suppress" 310, push notification software 212 may present the user with an option to register exception types for notifications that would not be suppressed while the user is engaged in the current application and/or context. In another example embodiment, responsive to exiting the current application, push notification software 212 may present the user with an option to view one or more suppressed notification messages 306. These are merely representative use cases and are not intended to be limiting.

Upon canceling received notification message 306 by selecting option "Cancel" 212, typically push notification software 212 discards received notification message 306 and allows the user to continue interacting with the current application and/or context.

In other example embodiments, and responsive to exiting the current application, push notification software 212 may present the user with an option to view one or more received notification messages 306. For example, after exiting the current application, push notification software 212 may provide the user with a list of one or more suppressed notification messages 306 via user interface 304. The user may then select a suppressed notification message from the one or more suppressed notification messages to view and take actions for.

Authenticator Push Notification Check in Offline Mode

Figure 4:
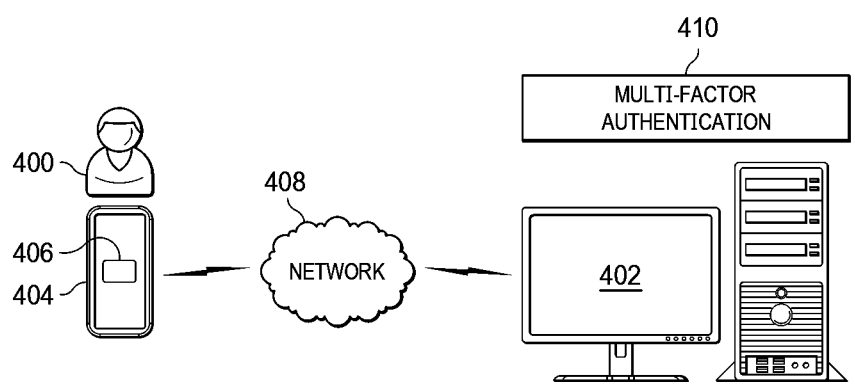
FIG. 4 depicts an operating scenario in which a user of a first device attempts to access a protected resource, and wherein a multi-factor authentication scheme is attempted to be enforced with respect to this access.

With the above as background, the techniques of this disclosure are now described. FIG. 4 depicts a representative operating scenario, which involves authenticating a user 400 on a first device 402, the user 400 having an associated second device 404 configured with an authenticator application 406, and wherein network access to the authenticator application cannot be assured (e.g., because of a non-existent or poor Internet connection 408, because the authenticator application is not active for some reason, or the like). For convenience, this operating scenario is sometimes referred to herein as an "offline" mode. A representative first device 402 is a network-accessible computing system that provides the user access to a protected resource upon the user's successful authentication, e.g., via a multi-factor authentication (MFA) scheme 410. A computing system of this type is depicted in FIG. 1. Typically, the multi-factor authentication 410 involves a first authentication that occurs by the user entering login information (e.g., username and password) on a secure login page provided to the user in a browser (or the like) at the first device. A second factor of the multi-factor authentication is one that would normally be enabled using a push notification protocol on the second device 404, which is typically the user's mobile device, such as a smart phone or tablet. Representative push notification protocols include, without limitation, Apple® Push Notification Service (APNs), Google® Cloud Messaging (GCM), and many others, and these protocols may be implemented as the push notification service depicted in FIGS. 2 and 3, and as described in the associated text. According to this disclosure, and when network access to the second device (and thus the authenticator application) cannot be assured, the authentication scheme is modified to enforce a delivery status request workflow, as is now described.

Figure 5:
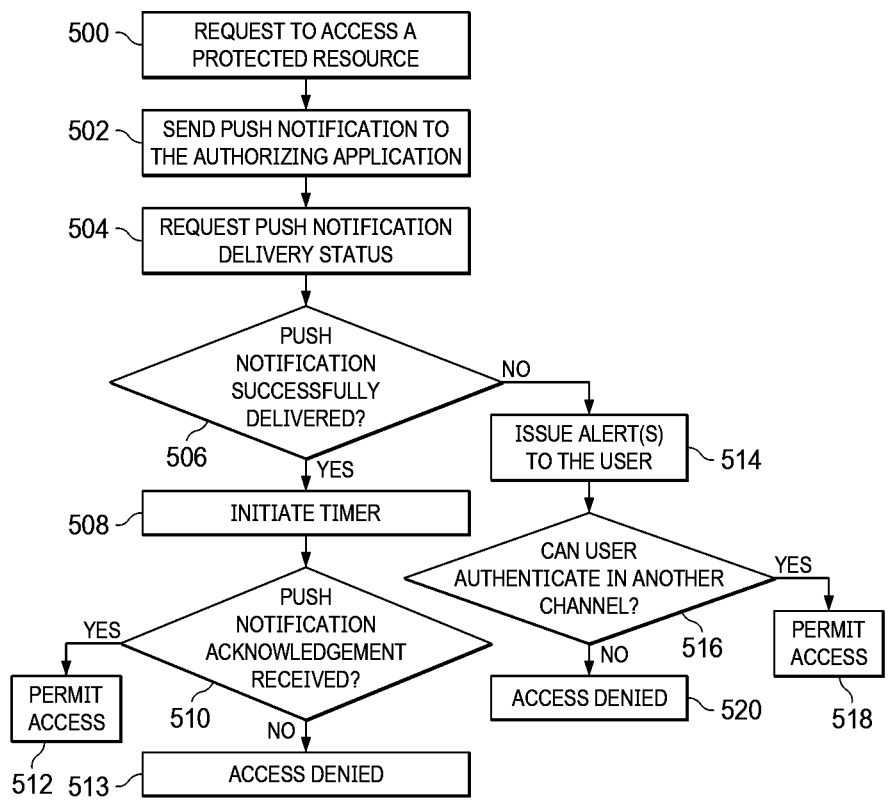
FIG. 5 depicts a process flow of an authentication technique according to this disclosure wherein a delivery status request processing flow is enforced.

In particular, and with reference to FIG. 5, a process flow depicting the authentication scheme with the delivery status request workflow of this disclosure is shown. As noted above, typically the technique of this disclosure is configured to operate within the context of an existing authentication workflow wherein the a user is seeking access to a protected resource over a network. The nature of the protected resource may vary but is typically a website or web application, a page or document associated with the site or application, a back-end application or data source that is accessible through the site, or the like. It is assumed that access to the protected resource requires the user to perform an authentication, and typically this authentication is MFA-based. The authentication system may be implemented natively at the computing system to which the user is seeking to access, or that authentication may leverage external systems (e.g., an authentication service provider, an identity provider, combinations thereof, and the like). The particular nature of the authentication is not an aspect of this disclosure, although preferably the delivery status request workflow herein is carried out as a second factor of a multi-factor authentication scheme.

The process begins at step 500 responsive to receipt of a request to access the protected resource. In response, and at step 502, a push notification is sent or caused to be sent to the authenticator application of the user's associated second device, which as noted is typically a portable mobile device. The authenticator application may be implemented in the push notification software previously described. At step 504, and while the push notification remains pending (i.e., presumed to have been sent but as yet un-acknowledged by the user at the second device), a delivery status of the push notification is requested. The delivery status request typically is generated by the delivery status request workflow code operating on (or in association with) the first device computing system, and it is directed to the push notification system (or other network components) for the purpose of determining the status of the attempted delivery of the push notification. After generating the delivery status request, a test is performed at step 506 to determine, based on the delivery status, whether the push notification has been successfully delivered to the authenticator application. When the outcome of the test at step 506 is positive, the method continues at step 508 by initiating a timeout from a timer. The timeout represents a time period during which the push notification must be acknowledged by the user of the second device to enable the user to be authenticated. The use of a timeout in this context during a push notification protocol is well-known. At step 510, a test is performed to determine if the push notification acknowledgement has been received within the time period. If the outcome of the test at step 510 is positive, then the routine continues at step 512 to enable the authentication to complete and permit access to the protected resource. Stated another way, steps 508, 510 and 512 represent a successful second factor authentication. If the outcome of the test at step 510 is negative, the authentication does not complete and access to the protected resource is denied.

Returning back to step 506, there may be circumstances when the delivery status request workflow indicates that that push notification does not succeed. There may be several reasons why this is case, but the usual situation would be where the user's Internet connectivity (to the second device) is not available or is too poor to enable the notification to be delivered (or the response to that notification to be transmitted back to the computing system running the push notification service). A negative outcome of the test at step 506 may also occur if the authenticator application itself is not functioning or has been switched off (i.e., is off-line). Thus, regardless of the particular cause, when based on the delivery status request flow the outcome of the test at step 506 is negative (indicating that the push notification does not succeed due to some delivery or related issue), the routine continues at step 514. At this step, preferably one or more alerts (messages) are provided to the user. In one embodiment, the alert is provided in a user interface of the first device, e.g., in a display panel dedicated to providing the user a status of the push notification delivery. Thus, step 514 indicates to the user (or other interested system or process) the delivery status of the push notification (i.e., that the push notification delivery has not succeeded for one or more of the reasons described above). Preferably, the alert also includes or has associated therewith an instruction to the user to attempt an authentication through an alternative communication channel. In the latter case, the method then continues at step 516 to determine whether the user can authenticate through an alternative authentication channel. The alternative communication channel may vary, and it may include a distinct authentication workflow such as entry of a biometric, obtaining a token or other assertion from another provider that vouches for the user, completing a challenge-response workflow, an SMS or MMS workflow, email, and the like. The particular nature of the alternative communication (authentication) channel may vary. If the outcome of the test at step 516 is positive, the user is permitted at step 518 to complete the permitted access to the protected resource; conversely, if the outcome of the test at step 516 is negative, at step 520 the request to access is declined or some other action (e.g., sandboxing the request, logging the access request, etc.) is carried out. Thus, like steps 508, 510 and 512, steps 514 and 516 provide a path for the second factor of an MFA scheme to complete.

The above-described technique provides significant advantages. The delivery status workflow solves the problem of how to check that the end user's device is Internet-enabled or otherwise has sufficient connectivity so as to ensure that the push notification required by the MFA scheme is actually received and can be acted upon. By using the technique herein, the authentication scheme is still enabled to complete even when the default push notification scheme cannot.

Generalizing, the method according to this disclosure may be implemented as a standalone approach, e.g., a software-based function executed by a processor, or it may be available as a managed service (including as a web service via a SOAP/XML interface). The particular hardware and software implementation details described herein are merely for illustrative purposes, and they are not meant to limit the scope of the described subject matter.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the authentication method having the delivery status request processing workflow code are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, security systems and devices, access control mechanisms, as well as improvements to the operational capabilities of such systems when used in the manner described.

Having described the subject matter, what is claimed is as follows.

The invention claimed is:

1. A method for authenticating a user on a first device, the user having an associated second device configured with an authenticator application, comprising:
responsive to receipt of a request to access a protected resource, initiating, by the first device, a push notification to be sent to the authenticator application of the second device;
while the push notification remains pending:
requesting, by the first device, a delivery status of the push notification from a push notification system;
upon determining based on the delivery status that the authenticator application is not offline, initiating, by the first device, a timeout that represents a time period during which the push notification must be acknowledged to enable the user to be authenticated; and
upon determining based on the delivery status that the authenticator application is offline, providing, by the first device, an alert to the user.

2. The method as described in claim 1 wherein the alert is provided in a user interface of the first device and indicates the delivery status of the push notification.

3. The method as described in claim 2 wherein the alert also includes or has associated therewith an instruction to the user to attempt an authentication through an alternative communication channel.

4. The method as described in claim 3 further including permitting the user to access the protected resource upon receipt of the authentication through the alternative communication channel.

5. The method as described in claim 1 further including:
determining within the time period whether an acknowledgement of the push notification has been received from the second device; and
upon determining within the time period that the acknowledgement has been received, permitting access to the protected resource.

6. The method as described in claim 1 wherein the push notification is associated with a second factor of a multi-factor authentication scheme.

7. The method as described in claim 3 further including denying access to the protected resource upon a determination that authentication through the alternative communication channel is not successful.

8. An apparatus, comprising:
a processor;
computer memory holding computer program instructions executed by the processor to authenticate a user on the apparatus, the user having an associated second device configured with an authenticator application, the computer program instructions comprising program code configured to:
responsive to receipt of a request to access a protected resource, initiating by the apparatus a push notification to be sent to the authenticator application of the second device;
while the push notification remains pending:
request, by the apparatus, a delivery status of the push notification from a push notification system;
upon determining based on the delivery status that authenticator application is not offline, initiate, by the apparatus, a timeout that represents a time period during which the push notification must be acknowledged to enable the user to be authenticated; and
upon determining based on the delivery status that the authenticator application is offline, provide, by the apparatus, an alert to the user.

9. The apparatus as described in claim 8 wherein the apparatus includes a user interface, wherein he alert is provided in the user interface and indicates the delivery status of the push notification.

10. The apparatus as described in claim 9 wherein the alert also includes or is associated with an instruction to the user to attempt an authentication through an alternative communication channel.

11. The apparatus as described in claim 10 wherein the computer program instructions further include program code that permits the user to access the protected resource upon receipt of the authentication through the alternative communication channel.

12. The apparatus as described in claim 8 wherein the computer program instructions further include program code to:
determine within the time period whether an acknowledgement of the push notification has been received from the second device; and
upon determining within the time period that the acknowledgement has been received, permit access to the protected resource.

13. The apparatus as described in claim 8 wherein the push notification is associated with a second factor of a multi-factor authentication scheme.

14. A computer program product in a non-transitory computer readable medium, the computer program product holding computer program instructions that, when executed by a processor in a first device, authenticate a user, the user also having an associated second device configured with an authenticator application, the computer program instructions comprising program code configured to:
responsive to receipt of a request to access a protected resource, initiate by the first device a push notification to be sent to the authenticator application of the second device;
while the push notification remains pending:
request, by the first device, a delivery status of the push notification from a push notification system;
upon determining based on the delivery status that the authenticator application is not offline, initiate, by the first device a timeout that represents a time period during which the push notification must be acknowledged to enable the user to be authenticated; and
upon determining based on the delivery status that the authenticator application is offline, provide, by the first device, an alert to the user.

15. The computer program product as described in claim 14 wherein the alert is provided in a user interface of the first device and indicates the delivery status of the push notification.

16. The computer program product as described in claim 15 wherein the alert includes or is associated with an instruction to the user to attempt an authentication through an alternative communication channel.

17. The computer program product as described in claim 16 wherein the computer program instructions further include program code that permits the user to access the protected resource upon receipt of the authentication through the alternative communication channel.

18. The computer program product as described in claim 14 wherein the computer program instructions further include program code to:
determine within the time period whether an acknowledgement of the push notification has been received from the second device; and
upon determining within the time period that the acknowledgement has been received, permit access to the protected resource.

19. The computer program product as described in claim 14 wherein the push notification is associated with a second factor of a multi-factor authentication scheme.

20. The computer program product as described in claim 16 wherein the computer program instructions further include program code that denies access to the protected resource upon a determination that authentication through the alternative communication channel is not successful.

* * * * *